(12) United States Patent
Case et al.

(10) Patent No.: US 6,357,558 B1
(45) Date of Patent: Mar. 19, 2002

(54) BEARING DEVICE FOR SUPPORTING A WHEEL AND EQUIPPED WITH BRAKING MEANS

(75) Inventors: Jean-Claude Case, Bonneuil en Valois; Jean-Marie Rouillard, La Croix Saint Ouen; Stéphane Vidal, Longueil Sainte Marie, all of (FR)

(73) Assignee: Poclain Hydraulics Industrie, Verberie (FR)

( * ) Notice: Subject to any disclaimer, the term of this patent is extended or adjusted under 35 U.S.C. 154(b) by 0 days.

(21) Appl. No.: 09/624,819

(22) Filed: Jul. 25, 2000

(30) Foreign Application Priority Data

Jul. 27, 1999 (FR) .............................. 99 09716

(51) Int. Cl.⁷ .......................... B60T 1/06; B60B 27/06; F16D 55/22; B60K 7/00
(52) U.S. Cl. ..................... 188/71.5; 188/72.3; 188/170; 188/18 A
(58) Field of Search ............................... 188/71.5, 71.1, 188/170, 71.6, 72.3, 365, 366, 367, 368, 264 R, 264 P, 264 D, 18 A, 18 R

(56) References Cited

U.S. PATENT DOCUMENTS

| 4,275,616 A | 6/1981 | Ehrlinger et al. |
| 4,562,903 A | 1/1986 | Rogier |

FOREIGN PATENT DOCUMENTS

| DE | 3222261 | | 12/1983 |
| DE | 10035196 | * | 3/2001 |
| EP | 1072814 | * | 1/2001 |
| FR | 2796886 | * | 2/2001 |
| FR | 2797008 | * | 2/2001 |

* cited by examiner

Primary Examiner—Douglas C. Butler
(74) Attorney, Agent, or Firm—Ladas & Parry

(57) ABSTRACT

A bearing device (10A) for supporting a wheel and equipped brake including a rotary shaft (5) carrying a rotary plate (9) suitable for supporting a wheel rim, a stationary hub (1C) disposed around the rotary shaft (5), a bearing unit comprising at least one rolling bearing (8A, 8B) supporting the shaft as it rotates relative to the hub, the brake comprising a first series of at least one annular brake disk (28) secured to the hub (1C) and a second series of at least one annular brake disk (30) constrained to rotate with the shaft (5) relative to the hub. The device includes first axial wall element (24) and a second axial wall element.

18 Claims, 4 Drawing Sheets

BEARING DEVICE FOR SUPPORTING A WHEEL AND EQUIPPED WITH BRAKING MEANS

The present invention relates to a bearing device for supporting a wheel and equipped with braking means. The device includes a rotary shaft carrying a rotary plate suitable for supporting a wheel rim, a stationary hub disposed around the rotary shaft, a bearing unit comprising at least one rolling bearing supporting the shaft as it rotates relative to the hub, and braking means comprising a first series of at least one annular brake disk secured to the hub and a second series of at least one annular brake disk constrained to rotate with the shaft relative to the hub.

A device of this type is known from Document FR 2 606 092 which shows a motor having radial pistons and having a rotary shaft supported by bearings in a stationary casing. An end of the shaft that is situated outside the casing carries a rotary plate serving for fixing to the rim of a wheel. The motor includes a brake having "outer" disks that are prevented from rotating relative to the casing by fluting provided in the inside periphery thereof, and "inner" disks which are constrained to rotate with the shaft by fluting provided in an axial portion of said shaft. The brake is situated in a region of the motor that is of relatively small diameter so that, in order to obtain high braking torque, it is necessary to provide a large number of disks, which gives rise to a large overall axial size. In other words, for a limited axial size, enabling only a limited number of disks to be received, the braking torque is relatively low. In spite of that, the bearing portion of the motor and the plate for fixing to the wheel rim have a relatively large overall radial size, since the plate projects radially relative to that portion of the casing in which the brake is situated.

Document DE 32 22 261 shows a braked bearing that also has a rotary plate for fixing to the rim of a wheel. The rotary portion is also inside the casing, the plate lying outside said casing while lying within the overall axial size of the casing of the bearing unit. Once again, the "inner" brake disks are secured to the rotary portion which is situated inside the casing, while the "outer" disks are secured to the stationary portion that is prevented from rotating. The rotary portion which is secured to the inner disks is in the form of a sleeve secured to the plate. It is supported as it rotates relative to the stationary portion by a bearing unit which is situated between the inner periphery of the sleeve and the outer periphery of a second sleeve which is secured to the stationary portion.

The present invention proposes to improve the above-mentioned prior art by making it possible to obtain a braking torque that is higher within a limited axial size and by facilitating heat exchange between the brake and the outside.

This object is achieved by that facts that the device of the invention includes a first axial wall element forming a rotary brake ring constrained to rotate with the shaft relative to the hub and disposed around a portion of said hub that forms a second axial wall element, and that each disk of the second series is secured to the inner periphery of said rotary brake ring, while each disk of the first series is secured to the outer periphery of said second axial wall element surrounded by the rotary brake ring.

In the layout of the invention, the rotary portion of the brake formed by the ring secured to the shaft lies outside the bearing device. As a result, the brake can easily be disposed on a large diameter, so that its braking torque is significantly improved. In addition, the brake disk(s) that, via the ring, is/are constrained to rotate with the shaft lie on the outside. Thus, since the rotary portion of the brake lies on the outside, the exchange of heat between the brake and the surrounding environment is facilitated, thereby avoiding overheating of the brake disk(s) and of the fluid in contact therewith.

While providing braking on a large diameter, it is also possible to obtain a bearing device that is compact and whose flange supporting the rim of a wheel lies within the overall radial size of the device.

Advantageously, the disk(s) of the second series is/are of outside diameter greater than the outside diameter of the disk(s) of the first series, each disk of the second series co-operating via its outer periphery with the rotary brake ring, while each disk of the first series co-operates via its inner periphery with said second axial wall element surrounded by the rotary brake ring.

As a result the "outer" disks, which are of larger diameter, are secured to the rotary portion of the brake.

In an advantageous layout, the device includes a stationary abutment member secured to the second axial wall element, the disks of the braking means being disposed between said abutment member and means forming a brake piston suitable for taking up a braking configuration in which an active piston portion is moved towards the abutment member to urge the brake disks into braking contact as well as a brake release configuration in which said active portion is moved away from the abutment member.

In the braking configuration, the active piston portion is pressed against the first brake disk, and the disks are clamped together (braking contact) between said active piston portion and the abutment member.

The brake piston is normally stationary, i.e. it is prevented from rotating. The fact that the abutment member is also chosen to be prevented from rotating makes it possible to ensure that, during braking, the disks of the two series are clamped between two elements that are prevented from rotating. Thus, the braking effect is obtained directly by the friction of the disks, and by the two stationary elements, without it being necessary for the thrust forces of the brake piston to be withstood by the rolling bearing(s) of the bearing unit, which rolling bearings take up the axial forces and the radial forces due to the rotation of the shaft relative to the hub. In other words, the stresses exerted on the bearing unit during braking are thus reduced.

Advantageously, the device includes a braking resilient return member suitable for co-operating with the brakepiston-forming means to urge said means continuously towards their braking configuration, a brake release hydraulic chamber suitable for being fed with fluid under pressure so as to urge the brakepiston-forming means towards their brake release configuration, and a braking hydraulic chamber suitable for being fed with pressurized fluid so as to urge the brakepiston-forming means towards their braking configuration.

The presence of the braking resilient return member makes it possible to provide a parking braking effect and an emergency braking effect, when, during abnormal operating, the fluid pressure that normally feeds the brake release hydraulic chamber decreases. The presence of the braking hydraulic chamber also makes it possible to perform in-service or dynamic braking, actuated positively by a pressurized fluid feeding the braking chamber. A multi-effect brake is thus obtained, in which the parking and emergency braking effect and the hydraulic brake release effect are combined with a dynamic braking effect.

In which case, it is advantageous for the brakepiston-forming means to comprise first and second pistons, the first piston having an active face suitable for co-operating directly with a first brake disk adjacent to said active face, the braking hydraulic chamber being defined between said first piston, a portion of the stationary hub referred to as the "brake support", and the second piston, the second piston co-operating with the braking resilient return member, being mounted to slide relative to the first piston and relative to the brake support, and being suitable for coming into abutment against said first piston under the effect of the braking resilient return member so as to push the first piston against the first brake disk.

This layout makes it possible to make the above-mentioned multi-effect brake simply and compactly. In addition, dynamic hydraulic braking affects the first piston, while parking and emergency braking and brake release affect the second piston. As a result, the brake release hydraulic chamber and the braking hydraulic chamber are separate, so that the in-service braking forces are independent of the forces generated in the brake release chamber by the brake release fluid. Thus, during in-service braking, braking pressure does not have to displace all of the brakepiston-forming means and does not have to overcome the brake release force which is exerted on these means, but rather it acts on a portion only of the brakepiston-forming means (in this example, the first piston).

The first piston then advantageously has an annular extension extending on the side opposite from its active face, the extension being disposed between the brake support and a zone of the second piston that has an axial overlap relative to said brake support, and the braking chamber is defined between said annular extension, the brake support, and said zone of the second piston.

Thus, the separation and the sealing between the inservice braking chamber and the brake release chamber are provided by a simple layout.

The invention also provides an assembly constituted by a hydraulic motor including a rotary shaft disposed in a stationary casing, and by a bearing device of the invention for supporting a wheel, the casing of the motor constituting a portion of the stationary hub.

In the assembly of the invention, in addition to the fact that the bearing device has the above-mentioned characteristics, the motor is a hydraulic motor having radial pistons, and the fixed hub constitutes a casing portion of the motor.

The assembly is of small overall axial size. In addition, the rotary ring overlaps the second axial wall element formed by an axial portion of the stationary hub, which itself constitutes a casing portion of the motor.

In other words, a portion of the casing of the motor (the fixed hub) is surrounded by the rotary ring which is itself secured to the rotary plate. As a result, the plate may be of large diameter, which makes it possible to place the fixing of the wheel rim on a large diameter. The rim can be coupled directly to the fixing plate which is secured to the rotary ring. Regardless of whether or not the ring is made integrally with the plate, the connection between these elements is dimensioned to withstand both the braking torque and the drive torque on the wheel rim. In general, this assembly increases the rigidity of the fixing of the rim by direct coupling with the plate and with the rotary ring.

The invention will be well understood, and its advantages will appear more clearly on reading the following detailed description of an embodiment shown by way of non-limiting example. The description refers to the accompanying drawings, in which.

Figure 1:
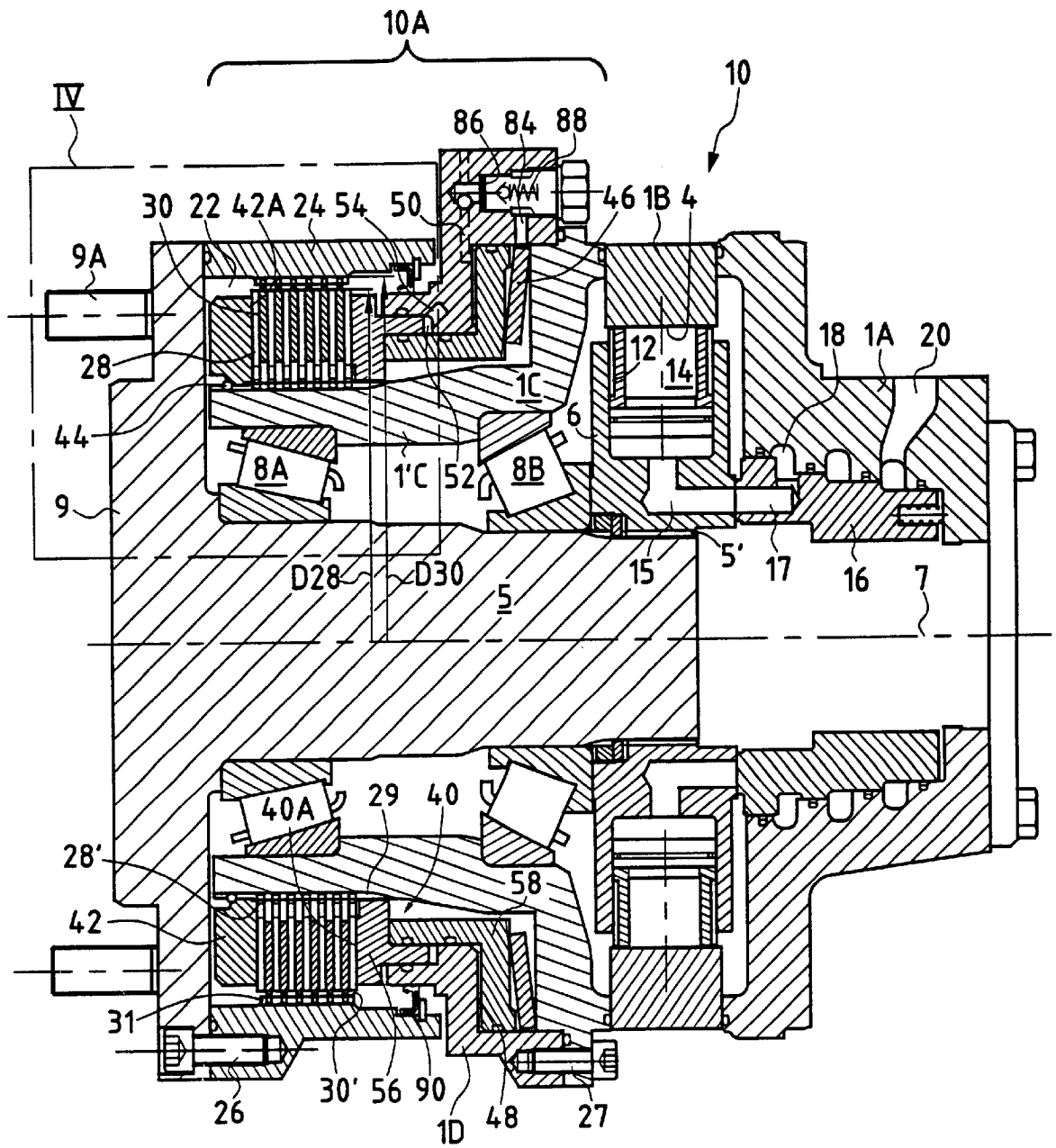
FIG. 1 is an axial section view of a hydraulic motor having radial pistons and equipped with a bearing device of the invention.

FIG. 1 shows a hydraulic motor 10 having radial pistons, having a rotary shaft, and having a stationary casing. The casing is made up of three portions, namely a first portion 1A referred to as a "distribution cover", a second portion 1B whose inner periphery is undulating so as to form a reaction cam, and a third portion 1C which is referred to as a "stationary hub" below. The portions 1A, 1B, and 1C are fixed together by means of screws (not shown). The motor includes a cylinder block 6 which is mounted to rotate about an axis of rotation 7 relative to the cam 4, and which is provided with a plurality of radial cylinders 12 inside which pistons 14 are disposed.

The cylinder block 6 rotates a shaft 5 which co-operates therewith via fluting 5'. That end of the shaft 5 which is opposite from the distribution cover carries an outlet plate 9 which, via screws 9A, can be fixed to the rim of a wheel so as to rotate said wheel. The hub 1C extends around the shaft 5 (the plate 9 however extending axially beyond said hub), and the shaft 5 is supported relative to the hub by rolling bearings, e.g. using conical rollers 8A, 8B. These bearings co-operate with the inner periphery of a portion 1'C of the hub in the form of an axial sleeve. In the present text, this portion is referred to as the "second axial wall element".

In a manner that is known, e.g. from FR 2 588 616, the motor 10 includes an internal fluid distributor 16 which is secured to the distribution cover 1A. This distributor has distribution ducts 17 alternately put in communication with cylinder ducts 15 of the cylinder block as said cylinder block is rotating.

The ducts 17 are connected to main inlet or outlet ducts such as the duct 20 via grooves 18 provided between the distributor and the distribution cover.

The bearing device 10A includes braking means disposed on the outside of the second axial wall element 1'C relative to the axis of rotation 7.

The braking means comprise annular brake disks which are disposed in a braking enclosure 22 provided between the outer periphery of the second axial wall element 1'C and the inner periphery of a "first" axial wall element 24 which is constrained to rotate with the shaft 5 about the axis 7, and which is disposed around the second axial wall element 1'C. This axial wall element 24 forms a brake ring which, in the example shown, constitutes a piece distinct from the rotary plate 9 and is fixed thereto, e.g. by screws 26.

The second axial wall element 1'C forms the stator relative to which the rotary ring 24 that surrounds it is to be braked by the braking means.

Figure 4:
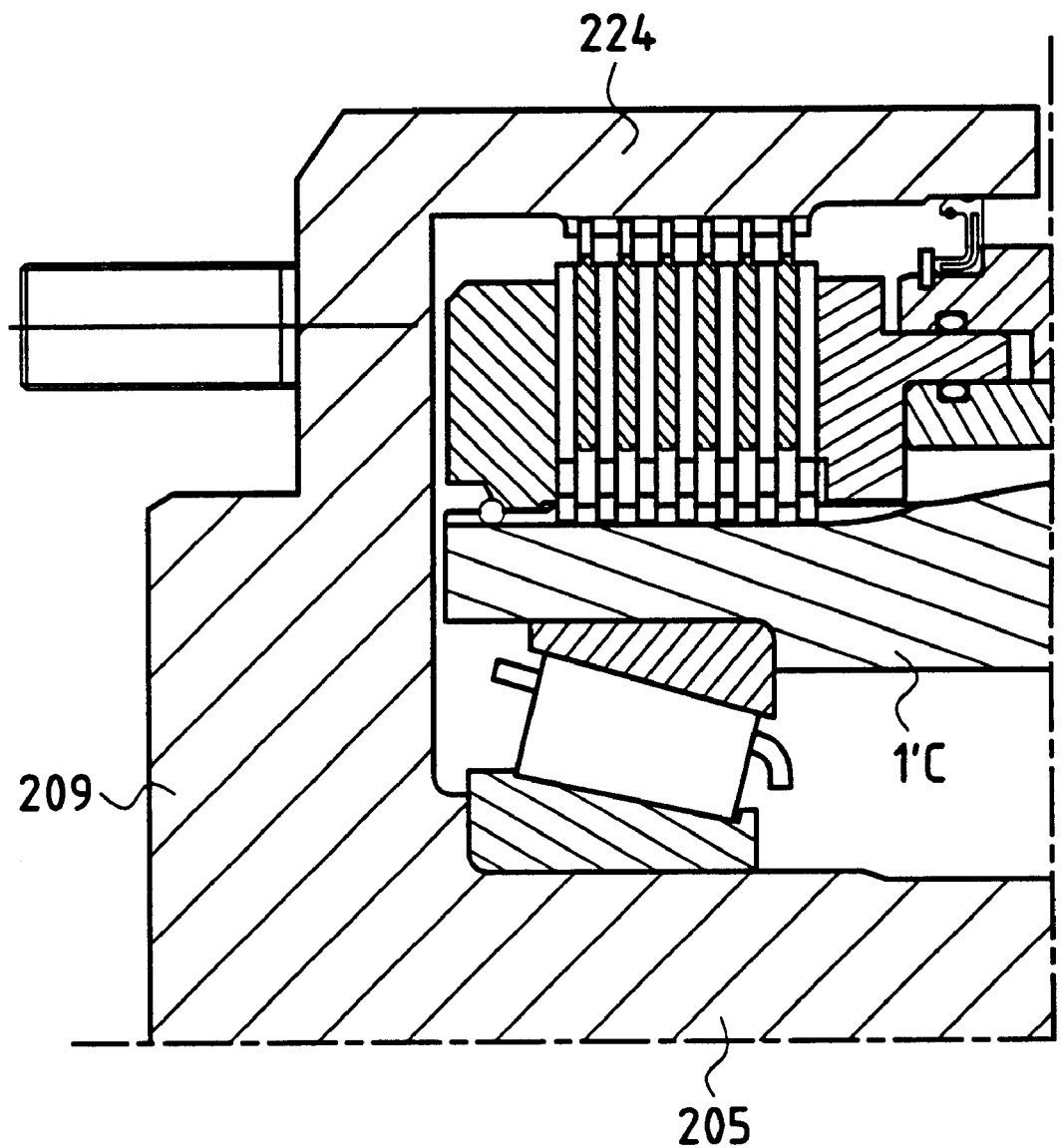
FIG. 4 is a fragmentary view of a variant, in a region corresponding to the region IV of FIG. 1.

Alternatively, and as shown in FIG. 4, it is also possible to make provision for the brake ring 224 formed by the first axial wall element to be made integrally with the rotary plate 209, the ring then being formed by an axial flange that extends from the plate 209 above the shaft 205 and above the second axial wall element 1'C.

The brake disks disposed in the enclosure 22 are situated above the rolling bearing 8A. The brake disks are distributed in two series of disks. The disks 28 of the first series are secured to the outer periphery of the second axial wall element 1'C which is itself surrounded by the ring 24, while the disks 30 of the second series are secured to said ring 24. Each disk 30 is interposed between two disks 28, and at least some disks have friction coatings so that braking occurs when they are pressed together.

The disks 30 are referred to as "outer disks" because they have an outside diameter D30 that is larger than the outside diameter D28 of the disks 28 which are referred to as "inner disks". The outer disks 30 co-operate with the ring 24 via their outer peripheries, while the inner disks 28 co-operate with the second axial wall element 1'C via their inner peripheries. More precisely, the inner periphery of the ring 24 is equipped with fluting 31 which engages with teeth 30' provided on the outer periphery of the disks 30. Conversely, the outer periphery of the second axial wall element 1'C is provided with fluting 29 which engages with teeth 28' provided on the inner peripheries of the disks 28.

In FIG. 1, the ring 24 is fixed to the plate 9 via screws 26 that are different from the pins 9A for fixing the plate to the rim of the wheel.

Figure 2:
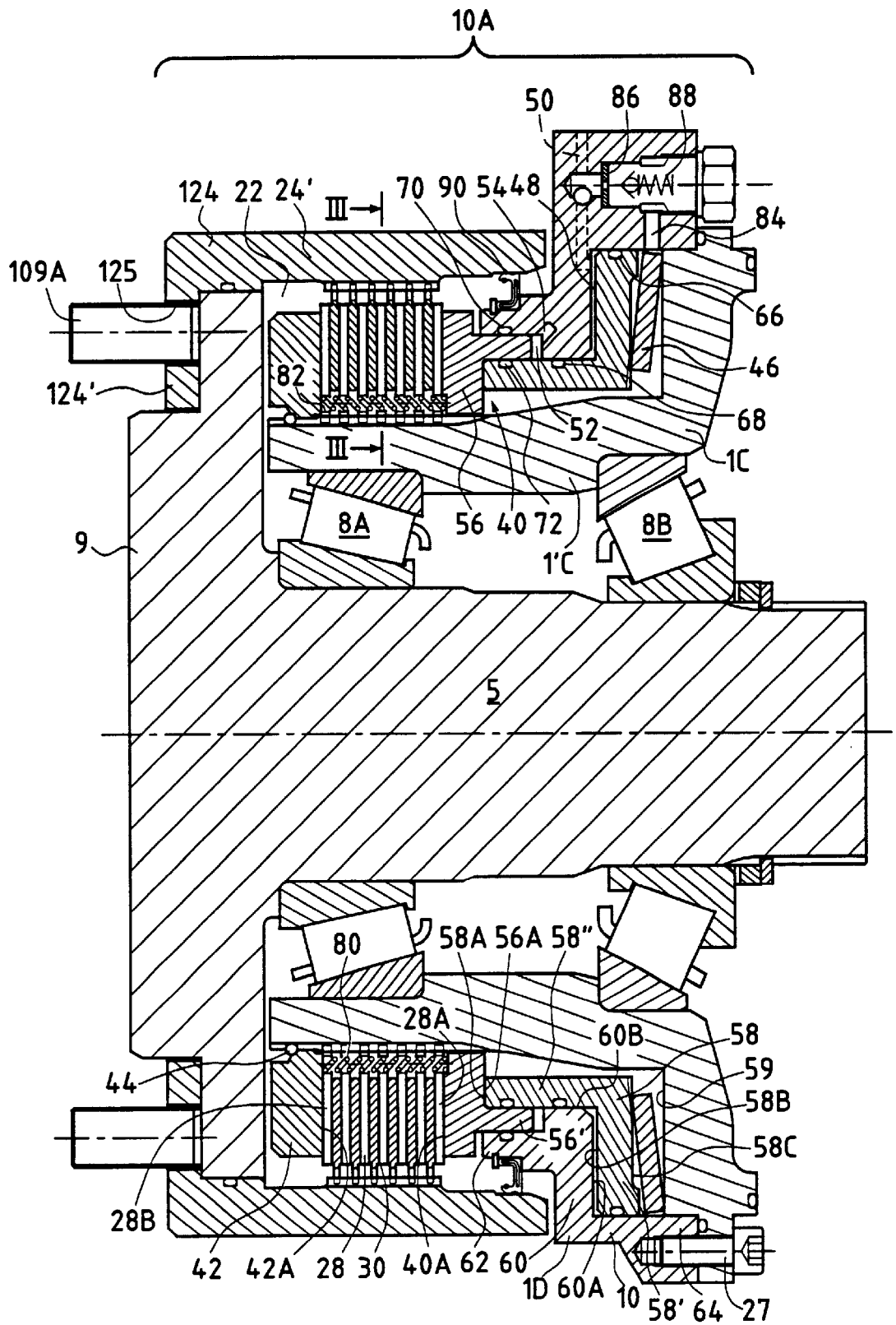
FIG. 2 is an axial section view of a variant of a bearing device.

In the variant shown in FIG. 2, the ring 24' is constituted by a portion that extends axially from a piece 124 which also includes a radial flange 124' that extends radially towards the axis 5 from the portion 24'. This flange 124' is provided with orifices 125 via which the pins 109A pass for fixing the plate 9 to the rim of the wheel. In other words, the pins 109A serve not only to fix the rim of the wheel to the plate 9, but also to fix the piece 124 that includes the ring 24' to said plate.

Identical elements in FIGS. 1 and 2 are given the same references. A description follows of the other component parts of the braked bearing device, and of the operation of the brake, with reference to either one of FIGS. 1 and 2.

The brake is actuated by means forming a brake piston 40 suitable for taking up a braking configuration and a brake release configuration.

The device includes a stationary abutment member 42 which is secured to the hub 1C and, more precisely to the second axial wall element 1'C. For example, the stationary abutment member may be constituted by an annular flange piece 42 which is disposed around the second axial wall element 1'C and which is retained to prevent it from being axially displaced (in the direction tending to move away from the means forming a brake piston) relative to the hub by means of a retaining ring 44. This retaining ring is locked relative to the second axial wall element 1'C by being disposed in a groove or the like provided in the outer periphery of the second axial wall element 1'C. For example, said groove may be formed merely by locally turning the fluting 29. The retaining rod 44 co-operates with that face of the flange piece 42 which faces the plate 9. The retaining ring constitutes extremely simple and low-cost means for securing the flange piece 42 to the second axial wall element 1'C.

The brake disks 28 and 30 are received in the enclosure 22 between the flange piece 42 and the means 40 forming a brake piston. An axial gap is provided between an abutment face 42A of the flange piece 42 that is opposite from the plate 9 and an "active" face 40A of the piston-forming means 40, which face 40A faces the flange piece 42. It can be understood that the active face 40A can be brought towards the flange piece to clamp the disks together and thus to urge them into braking contact. Similarly, it can be moved away from the flange piece 42 so as to allow the disks 28 and 30 to rotate relative to one another.

The means forming the brake piston are urged continuously into the braking configuration by means of a braking resilient return member 46, e.g. a Belleville-type spring washer. They are urged into their brake release configuration by feeding a hydraulic brake release chamber 48 with fluid, the increase in volume of the chamber having an effect opposing the return effect of the spring 46. The chamber is fed via a brake release duct 50 indicated in dashed lines (since this duct does not lie in the section plane). The braking performed by the spring 46 is parking or emergency braking, which is active when the fluid contained in the chamber 48 is not under pressure or when, in general, the fluid feed is deficient.

In the advantageous example shown in the drawings, the brake also has a dynamic, in-service braking effect. For this purpose, the braking means include a braking hydraulic chamber 52 which can be fed with pressurized fluid to urge the means forming the brake piston 40 towards their braking configuration. This chamber 52 is fed via a braking duct 54, only the beginning of which is shown.

Advantageously, as shown in the figures and as seen more clearly in FIG. 2, the means forming the braking piston 40 comprise two brake pistons. The first piston 56 has the active face 40A that co-operates with the brake disk that is closest to said active face. The second piston 58 co-operates with the spring 46. The two pistons 56 and 58 that form the assembly 40 are mounted to slide relative to each other. The spring 46 tends to push the second piston 58 by constraining it to come into abutment against the first piston 56 so as to push the first piston against the first brake disk. More precisely, the first piston 56 is provided with an abutment face 56A situated on the side opposite from the active face 40A, with which abutment face a complementary abutment face 58A can co-operate. In this example, the complementary abutment face is formed at the end of the second piston 58.

The braking hydraulic chamber 52 is defined between the first piston 56 and a portion 1D of the hub that is referred to as the "brake support". Thus, the dynamic braking effect due to fluid being fed into the braking chamber 52 is independent from the brake release effected by feeding fluid into the chamber 48. Thus, in order for the dynamic brake to act, it is thus not necessary for the braking pressure to be greater than the brake release pressure.

In the example shown, the portion 1D of the hub 1C that defines the chamber 52 is formed in an additional piece that is fixed to the hub by screws 27. This piece 1D has a portion in the form of a radial flange 60 that separates the braking chamber 52 from the brake release chamber 48. The piece 1D also includes a first axial extension in the form of a sleeve 62 which extends from the flange 60 towards the plate 9. It has a second axial extension 64 situated on the side opposite from the extension 62 and co-operating with the screws 27.

The second piston 58 is mounted to slide relative to the piece 1D. More precisely, the brake release chamber 48 is defined between a face 60A of the flange 60 that is opposite from the plate 9, and a substantially radial face 58B of the second piston that is opposite from said face 60A. The spring 46 is mounted between a radial face 59 of the hub 1C that faces towards the plate 9, and a radial face 58C of the piston that is opposite from the face 58B.

The second piston 58 thus includes a portion in the form of an annular disk 58' that is defined between the faces 58B and 58C and that is disposed between the flange 60 of the brake support and the spring 46.

The second piston also includes a zone in the form of an axial sleeve 58" which extends from the annular portion 58' towards the plate 9. The outer periphery of the sleeve 58" co-operates with the inner radial end 60B of the flange 60 of the brake support and slides against said end.

An annular space is provided between the extension 62 of the brake support and the sleeve 58". The first piston 56 has an annular extension 56' which extends on the side opposite from its active face 40A. This annular extension is disposed between the brake support (its portion 62) and a zone of the second piston (the sleeve 58") that has an axial overlap relative to said brake support. The braking chamber 52 is delimited between said annular extension 56', the brake support ID (the inner periphery of the portion 62 and a radial face of the flange 60 that faces towards the plate 9 and that extends radially inwards from the portion 62), and the annular portion 58' of the second piston.

The brake release chamber 48 is sealed by a first sealing gasket 66 disposed in a recess provided in the outer axial face of the portion 58' of the second piston 58 and co-operating with the inner axial face of the portion 64 of the piece 1D, and by a second sealing gasket 68 disposed in a recess provided in the outer axial face of the sleeve 58" and co-operating with an axial face of the flange 60 that is situated at the inner radial end 60B thereof.

The braking chamber 52 is sealed firstly by said sealing gasket 68 and secondly by two sealing gaskets 70 and 72, co-operating respectively with the outer periphery and with the inner periphery of the extension 56' of the piston 56, and situated respectively in a recess provided in the inner axial face of the portion 62 of the brake support and in a recess provided in the outer axial face of the sleeve 58" of the piston 58. The gaskets, in particular the gaskets 70 and 72, are, for example, O-ring gaskets.

The "first brake disk" which co-operates with the active face 40A of the means forming the brake piston is a disk 28A of the first series of disks 28. Similarly, the disk with which the face 42A of the abutment member 42 co-operates is also a disk of the first series, designated by reference 28B. On braking, the disks are clamped between two pieces prevented from rotating relative to the casing, namely, in this example, the abutment member 42 and the first piston 56. Thus, the thrust force of the brake piston that makes it possible to obtain the braking is not taken up by the rolling bearings 8A and 8B of the bearing unit.

The braking means further include brake release resilient return means which comprise at least one resilient return member 80 that is disposed between the stationary abutment 42 and the means forming the brake piston, which member is suitable for continuously urging the means forming the brake piston into their brake release configuration. Thus, on going from braking to brake release, in particular after dynamic braking due to the chamber 52 being fed with fluid, these brake release resilient return means facilitate moving the active face 40A away from the abutment 42 and thus facilitate establishing clearance between the disks, which makes it possible to reduce the drag effects due to the friction between the disks.

Figure 3:
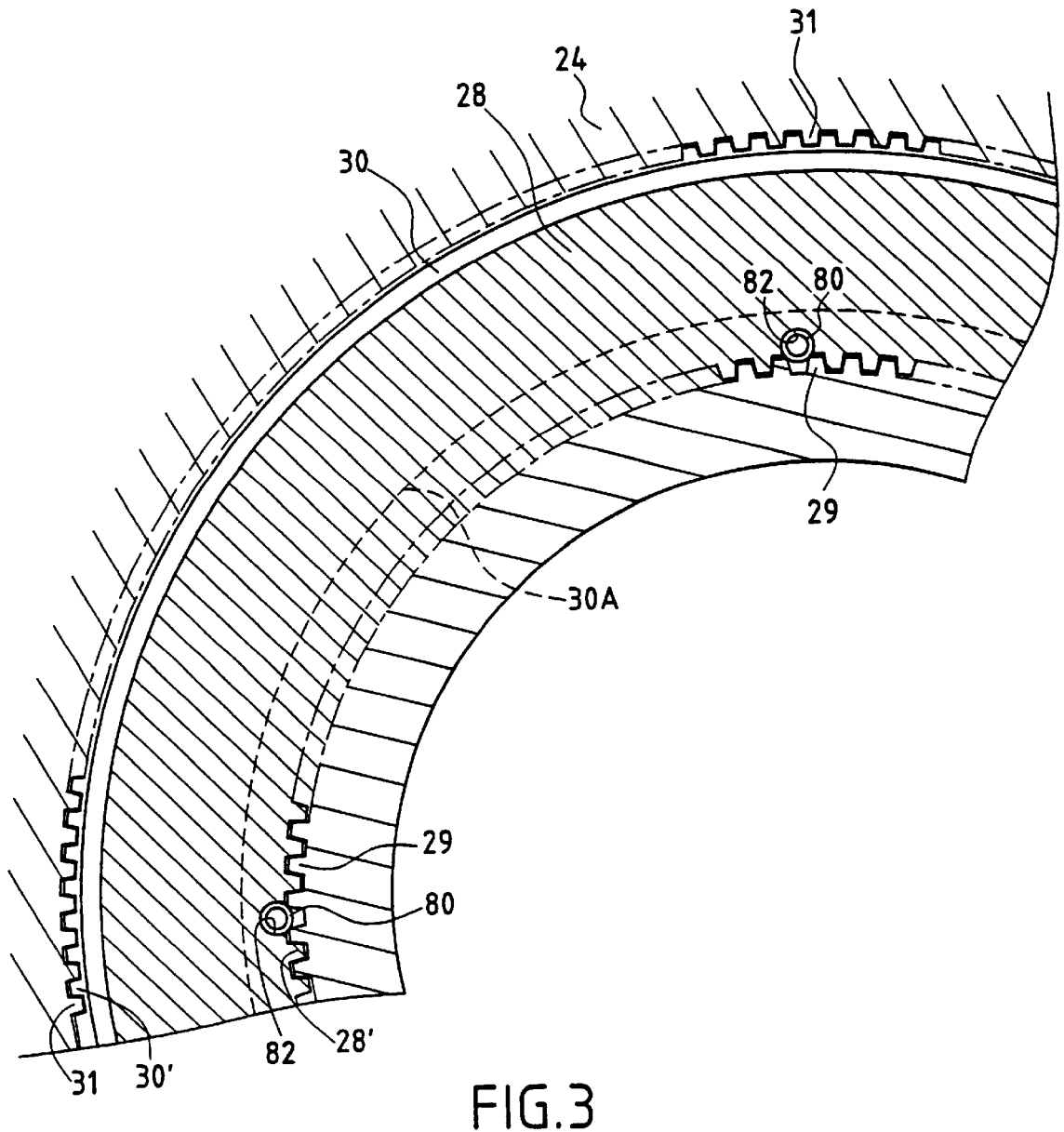
FIG. 3 is a fragmentary section view on line III—III of FIG. 2.

In the advantageous example shown, the resilient return member 80 shown in FIGS. 2 and 3 passes through the brake disks by going through perforations 82 provided in said disks. More precisely, the member(s) 80 is/are disposed in an annular space that is provided between the inner radial ends 30A of the outer disks 30 and the fluting 29. Thus, the members 80 pass through the inner disks only. To this end, the inner disks are provided with perforations 82. The perforations 82 are advantageously constituted by notches provided at the inner peripheries of the disks 28. To balance the brake release effect, a plurality of resilient members 80 spaced angularly apart from one another are provided. They are advantageously constituted by helical compression springs.

Advantageously, the bearing device of the invention includes a cooling duct 84 which is provided in the stationary portion (hub 1C or brake support 1D) of said device. In the example shown, the duct 84 opens out in the space inside the device, between the face 59 of the hub 1C and the face 58C of the piston 58. The cooling fluid then flows over the outer periphery of the second axial wall element 1'C and passes between the brake disks by means of the above-mentioned perforations 82. The fluid then naturally tends to flow radially outwards due to the rotation of the ring 24 which carries the disks 30, and floods the disks. The cooling fluid is then removed via a leakage return duct (not shown). The cooling duct 84 branches off from the brake release duct 50, to which it is connected via a restriction 86 and via a calibrated non-return valve 88.

The enclosure 22 which contains the brake disks communicates with that region of the device which contains the rolling bearings 8A and 8B. Thus, the cooling fluid also serves to cool that region of the device which contains the bearing units. The enclosure 22 is closed on the side closer to the piece 1D by a gasket 90 co-operating with the inside face of the axial wall element 24 and with the outside face of the portion 62 of the piece 1D.

An additional advantage of disposing the rotary brake ring around the second axial wall element belonging to the stationary hub lies in the fact that the rotary sealing gasket 90 isolating the inside of the assembly from the outside is disposed on a large diameter between the rotary brake ring 24 and the stator. The sealing gasket is thus remote from the flow of the cooling fluid and is not reached by any pollution generated by wear on the disk linings. In the prior art configurations, such pollution can accumulate at the gasket and cause leaks.

What is claimed is:

1. A bearing device for supporting a wheel and equipped with braking means, said device including a rotary shaft carrying a rotary plate suitable for supporting a wheel rim, a stationary hub disposed around the rotary shaft, a bearing unit comprising at least one rolling bearing supporting the shaft as it rotates relative to the hub, and braking means comprising a first series of at least one annular brake disk secured to the hub and a second series of at least one annular brake disk constrained to rotate with the shaft relative to the hub, said bearing device further including a first axial wall element forming a rotary brake ring constrained to rotate with the shaft relative to the hub and disposed around a portion of said hub that forms a second axial wall element, and each disk of the second series being secured to an inner periphery of said rotary brake ring while each disk of the first series is secured to an outer periphery of said second axial wall element surrounded by the rotary brake ring.

2. A device as claimed in claim 1, wherein the disk(s) of the second series is/are of outside diameter greater than an outside diameter of the disk(s) of the first series, each disk of the second series co-operating via an outer periphery thereof with the rotary brake ring, while each disk of the first series co-operates via an inner periphery thereof with said second axial wall element surrounded by the rotary brake ring.

3. A device as claimed in claim 1, wherein the brake ring is formed integrally with the rotary plate.

4. A device as claimed in claim 1, wherein the brake ring constitutes a piece distinct from the rotary plate which is fixed thereto.

5. A device as claimed in claim 4, wherein the wheel rim is fixed to the rotary plate by pins that also fix the brake ring to said rotary plate.

6. A device as claimed in claim 1, including a stationary abutment member secured to the second axial wall element, the disks of the braking means being disposed between said abutment member and means forming a brake piston suitable for taking up a braking configuration in which an active piston portion is moved towards the abutment member to urge the brake disks into braking contact as well as a brake release configuration in which said active portion is moved away from the abutment member.

7. A device as claimed in claim 6, wherein the fixed abutment member is formed by a flange piece disposed around the second axial wall element and prevented from moving axially relative thereto by a retaining ring.

8. A device as claimed in claim 6, including brake release resilient return means comprising at least one resilient return member disposed between the stationary abutment member and the brakepiston-forming means, and suitable for continuously urging said means towards their brake release configuration.

9. A device as claimed in claim 8, wherein the resilient return member(s) pass through the brake disks by passing through perforations provided in said disks.

10. A device as claimed in claim 6, including a braking resilient return member suitable for co-operating with the brakepiston-forming means to urge said means continuously towards their braking configuration, a brake release hydraulic chamber suitable for being fed with fluid under pressure so as to urge the brakepiston-forming means towards their brake release configuration, and a braking hydraulic chamber suitable for being fed with pressurized fluid so as to urge the brakepiston-forming means towards their braking configuration.

11. A device as claimed in claim 10, wherein the brake piston forming means comprise first and second pistons, the first piston having an active face suitable for co-operating directly with a first brake disk adjacent to said active face, the braking hydraulic chamber being defined between said first piston, a portion of the stationary hub forming a brake support, and the second piston, said second piston co-operating with the braking resilient return member, being mounted to slide relative to the first piston and relative to the brake support, and being suitable for coming into abutment against said first piston under the effect of the braking resilient return member so as to push the first piston against the first brake disk.

12. A device as claimed in claim 11, wherein the first piston has an annular extension extending on a side opposite from its active face, said extension being disposed between the brake support and a zone of the second piston that has an axial overlap relative to said brake support, and the braking chamber being defined between said annular extension, the brake support, and said zone of the second piston.

13. An assembly comprising a hydraulic motor and a bearing device for supporting a wheel and equipped with braking means, said device including a rotary shaft which is disposed in a stationary casing and which carries a rotary plate suitable for supporting a wheel rim, the bearing device including a stationary hub disposed around the rotary shaft, a bearing unit comprising at least one rolling bearing supporting the shaft as it rotates relative to the hub, and braking means comprising a first series of at least one annular brake disk secured to the hub and a second series of at least one annular brake disk constrained to rotate with the shaft relative to the hub, the motor being a hydraulic motor having radial pistons, the stationary hub constituting a casing portion of the motor, and the bearing device including a first axial wall element forming a rotary brake ring constrained to rotate with the shaft relative to the hub and disposed around a portion of said hub that forms a second axial wall element, and each disk of the second series being secured to the inner periphery of said rotary brake ring, while each disk (28) of the first series is secured to the outer periphery of said second axial wall element surrounded by the rotary brake ring.

14. An assembly as claimed in claim 13, wherein the disk(s) of the second series is/are of outside diameter greater than an outside diameter of the disk(s) of the first series, each disk of the second series co-operating via an outer periphery thereof with the rotary brake ring, while each disk of the first series co-operates, via an inner periphery thereof with said second axial wall element surrounded by the rotary brake ring.

15. An assembly as claimed in claim 13, wherein the brake ring is formed integrally with the rotary plate.

16. An assembly as claimed in claim 13, wherein the brake ring constitutes a piece distinct from the rotary plate which is fixed thereto.

17. An assembly as claimed in claim 16, wherein the wheel rim is fixed to the rotary plate by pins that also fix the brake ring to said rotary plate.

18. An assembly as claimed in claim 13, further including a stationary abutment member secured to the second axial wall element, the disks of the braking means being disposed between said abutment member and means forming a brake piston suitable for taking up a braking configuration in which an active piston portion is moved towards the abutment member to urge the brake disks into braking contact as well as a brake release configuration in which said active portion is moved away from the abutment member.

* * * * *